United States Patent Office 3,420,061
Patented Jan. 7, 1969

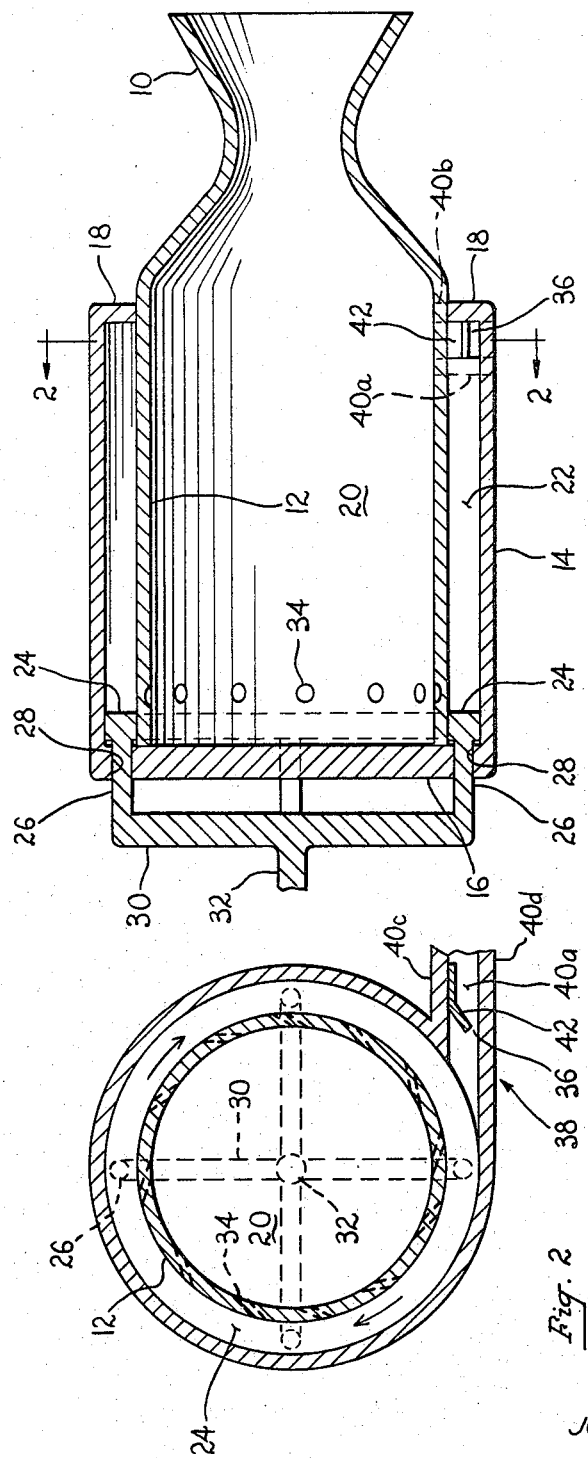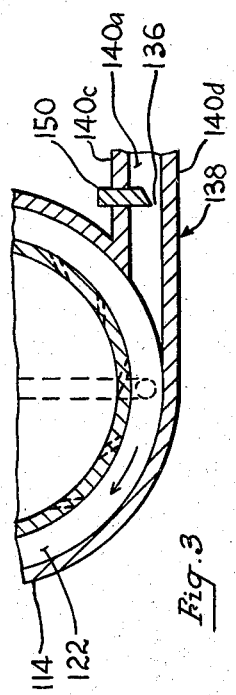

3,420,061
ROCKET COMBUSTION CHAMBER AND PROPELLANT INJECTION APPARATUS
John I. Schaeffer, Forest Place, Towaco, N.J., assignor to Thiokol Chemical Corporation, Bristol, Pa., a corporation of Delaware
Filed Nov. 4, 1966, Ser. No. 592,090
U.S. Cl. 60—267
Int. Cl. F02k *11/00;* F02c *7/12;* F02g *3/00*
5 Claims This invention relates to rocket motors and more particularly to an improved arrangement for cooling the combustion chamber of a rocket motor and for injecting liquid propellant therein.

The present invention provides a solution to one of the most difficult problems encountered in the design of a rocket motor, namely, the problem of cooling a combustion chamber without adversely affecting rocket payload. Furthermore, the present invention provides lightweight, effective means for injecting liquid propellant into the combustion chamber of a rocket motor.

It is therefore an object of the invention to provide an improved rocket motor.

Another object of the invention is to provide an arrangement whereby the combustion chamber of a rocket motor is effectively cooled by the liquid propellant injected therein.

An additional object of the invention is to provide uncomplicated means for injecting liquid propellant into the combustion chamber of a rocket motor in a more effective manner.

Still another object of the invention is to provide apparatus by means of which liquid propellant can be injected into the combustion chamber of a rocket motor at many different flow rates.

The aforesaid and other objects of the invention are achieved by apparatus comprising a pair of tubular, concentrically disposed housings which form the combustion chamber of a rocket motor and an annular cooling chamber disposed around said combustion chamber, the walls of said housings being provided with tangentially disposed apertures so that liquid propellant can be whirled around said cooling chamber at a relatively high velocity before it is injected tangentially into said combustion chamber.

A more comprehensive understanding of the invention will be obtained by consideration of the following description of two embodiments thereof, in which description reference is made to the accompanying drawings, wherein:

FIGURE 1 is longitudinal-sectional view of a preferred embodiment of the invention;

FIGURE 2 is a cross-sectional view of the same embodiment, taken along the plane represented by line 2—2 of FIGURE 1; and FIGURE 3 is a cross-sectional view of a modification of the embodiment illustrated in FIGURES 1 and 2.

Throughout the specification and drawings, like reference numbers designate like parts.

As illustrated in FIGURE 1, a preferred embodiment of the invention comprises a thrust nozzle 10 and a first cylindrical housing 12 the aft end of which is communicatively connected to the forward end of said thrust nozzle. A second cylindrical housing 14 is concentrically positioned around first housing 12 and is joined thereto by a first end closure 16 that is fixedly secured to the forward ends of said first and second housings and also by a second end closure 18 that is fixedly secured to said first housing and to the aft end of said second housing. Thus first and second housing 12, 14 and first and second end closures 16, 18 form the combustion chamber 20 of a rocket motor and an annular cooling chamber 22 that extends around said combustion chamber.

Slidably disposed within cooling chamber 22 is an annular piston 24. Four cylindrical shafts 26 (only two of which are illustrated in FIGURE 1, but all of which are illustrated by broken lines in FIGURE 2) are fixedly connected to piston 24 and are respectively slidably engaged within four holes 28 formed in first end closure 16. The outer ends of shafts 26 are fixedly connected to a spider 30, which can be moved toward or away from first end closure 16 by a drive shaft 32.

First housing 12 is provided with a plurality of apertures 34 which extend through its wall tangential to the inner surface thereof (as illustrated in FIGURE 2) and which are circumferentially spaced apart adjacent the forward end of said first housing. An aperture 36 extends through the wall of second housing 14 at the aft end thereof, this aperture being disposed tangential to the inner surface of said second housing (as illustrated in FIGURE 2). Fixedly joined to second housing 14 and axially aligned with aperture 36 therein is a conduit 38 having four sides 40a through 40d (two of which are illustrated by broken lines in FIGURE 1 and two of which are illustrated in cross-section in FIGURE 2). Preferably conduit 38 is provided with flow control means in the form of a leaf spring 42 one end of which is fixedly secured to the inner surface of side 40c thereof and the other end of which is disposed oblique to the longitudinal axis of the conduit. As illustrated in FIGURE 1, the side edges of leaf spring 42 slidably abut the inner surfaces of sides 40a and 40b, respectively, of conduit 38.

It will be obvious that the aforedescribed components of the embodiment of the invention illustrated in FIGURES 1 and 2 can be made of many different metals or other materials.

A conventional fluid reservoir and pump or a pressurized tank with the flow therefrom varied by a downstream throttle valve is connected to conduit 38 for forcing a liquid propellant under high pressure through the conduit and into cooling chamber 22. The position of the free end of leaf spring 42 will depend upon the pressure of the fluid within conduit 38. That is, when the pressure of the fluid injected into the conduit is relatively low, the free end of the leaf spring will be near the inner surface of side 40d of the conduit, and the cross-sectional flow area of aperture 36 will be small. Consequently, the velocity of the liquid propellant entering cooling chamber 22 will be higher than it would be if the free end of leaf spring 24 were farther from side 40d under the same fluid pressure. When the fluid pressure in conduit 38 is increased, leaf spring 42 is deflected in the direction of side 40c of the conduit, thus increasing the cross-sectional flow area of aperture 36. However, the velocity of fluid entering cooling chamber 22 remains high because the pressure within conduit 20 is higher than it was then the flow area of inlet 18 was smaller. Thus the velocity of the liquid propellant injected into cooling chamber 22 remains high over a wide range of flow rates.

It will be obvious that after the pump has been actuated to inject propellant into cooling chamber 22, the chamber will eventually be filled and there will be flow of the propellant through the apertures 24 in first housing 12. The conditions of propellant flow through the apertures 34 will depend, however, upon such factors as the pressure at which the propellant is injected into conduit 38, the cross-sectional flow area of aperture 36, and the cross-sectional area and number of apertures 34. For example, if the cross-sectional flow area of aperture 36 is one-half the total cross-sectional area of all of the apertures 34, only one-half of the cross-sectional of each aperture 34 will be filled with propellant. If the cross-sectional areas of apertures 34 equal the cross-sectional flow area of aperture 36, there will be full flow in each aperture 34. In both cases, the velocity of the propellant through apertures 34 is the same as the velocity of the propellant through aperture 36 (after flow equilibrium has been established) since there can be no accumulation of propellant within cooling chamber 22.

Because the liquid propellant is injected tangentially into cooling chamber 22, it is whirled around first housing 12 as it moves forward toward apertures 34. This action of the propellant within cooling chamber 22 results in a high rate of heat transfer from the wall of first housing 12 to the propellant. Furthermore, the injection of the propellant tangentially into combustion chamber 20 at a high velocity and at many different points spaced circumferentially thereof is advantageous from the standpoint of combustion of the propellant within said combustion chamber.

When it is desired to terminate the thrust of the rocket motor, drive shaft 32 can be actuated by conventional means (such as a hydraulic cylinder not shown) to move piston 24 from its illustrated position in FIGURE 1, wherein the piston is disposed forward of apertures 34, to a second position wherein the piston registers with said apertures and blocks the flow of liquid propellant therethrough. Conventional means are employed to simultaneously stop the operation of the pump (not shown) connected to conduit 38. It will be readily apparent that these mechanisms can be actuated in reverse to bring the rocket motor back into operation. An additional advantage of the above-described embodiment of the invention is that a large amount of propellant is in cooling chamber 22 when the rocket motor is shut down, so that a great amount of heat transfer to the propellant can be tolerated without causing the coolant (i.e., the liquid propellant in cooling chamber 22) to boil.

The construction of a second embodiment of the invention illustrated in FIGURE 3 is identical to that of the first-described embodiment except that conduit 138 is provided with flow control means in the form of a baffle 150 that is slidably engaged within a slot 152 in the wall of the conduit. The sides of baffle 150 respectively slidably abut the inner surfaces of the sides of conduit 138 that are disposed vertically in the drawing (only the one vertical side 140a being shown in FIGURE 3), and hence movement of the baffle toward or away from side 140d varies the cross-sectional flow area of aperture 136. Thus the velocity of propellant flow into cooling chamber 122 can be varied, for any particular fluid pressure within conduit 138, by the selective positioning of baffle 150 at different points within said conduit.

Various additional modifications of the preferred embodiment of the invention illustrated in FIGURE 1 can obviously be made without departing from the inventive concepts thereof. For example, the aft end of second housing 14 of the embodiment can be made coterminous with the aft end of thrust nozzle 10 so that the latter can also be cooled by the propellant injected into cooling chamber 22. It is therefore to be understood that the scope of the invention is limited only by the terms of the claims appended hereto.

What is claimed is:
1. In a rocket motor, the combination comprising a thrust nozzle, a first tubular housing the aft end of which is communicatively connected to the forward end of said thrust nozzle, a second tubular housing concentrically positioned around said first housing, a first end closure fixedly secured to the forward ends of said first and second housings, a second end closure fixedly secured to said first housing and to the aft end of said second housing, said first and second housings and said first and second end closures defining an annular cooling chamber extending around said first housing, said first housing being provided with a plurality of apertures which extend through its wall tangential to the inner surface thereof and which are circumferentially spaced apart adjacent the forward end thereof, said second housing being provided with at least one aperture which extends through its wall tangential to the inner surface thereof and which is adjacent the aft end thereof, and means for injecting liquid propellant under pressure through said aperture in said second housing, whereafter said propellant is whirled around said cooling chamber and injected through said apertures in said first housing.

2. The combination defined in claim 1 including an annular piston slidably disposed within said cooling chamber, and drive means for moving said piston longitudinally of said first housing between a first position thereof wherein it is disposed forward of said apertures in said first housing and a second position thereof wherein it blocks the flow of said propellant from said apertures.

3. The combination defined in claim 1 including flow control means disposed in said aperture in said second housing for varying the flow area thereof.

4. The combination defined in claim 3 wherein said flow control means comprises a baffle movably disposed within said aperture in said second housing.

5. The combination defined in claim 3 wherein said flow control means comprises a leaf spring mounted within said aperture in said second housing.

References Cited

UNITED STATES PATENTS

| | | | |
|---|---|---|---|
| 2,476,185 | 7/1949 | Goddard | 60—260 |
| 2,540,666 | 2/1951 | Goddard | 60—260 |
| 2,741,085 | 4/1956 | Prentiss | 60—260 |
| 2,995,008 | 8/1961 | Fox | 60—258 |

MARTIN O. SCHWADRON, *Primary Examiner.*

DOUGLAS HART, *Assistant Examiner.*

U.S. Cl. X.R.

60—258, 260, 39.66